Figure 3:
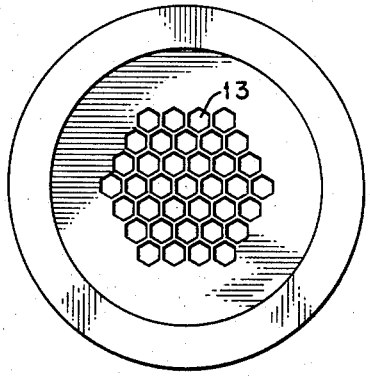

June 21, 1960  P. R. BELL ET AL  2,942,109
SCINTILLATION SPECTROMETER
Filed July 19, 1956  4 Sheets-Sheet 1

INVENTORS
Persa R. Bell
BY  John E. Francis

*Roland A. Anderson*

ATTORNEY

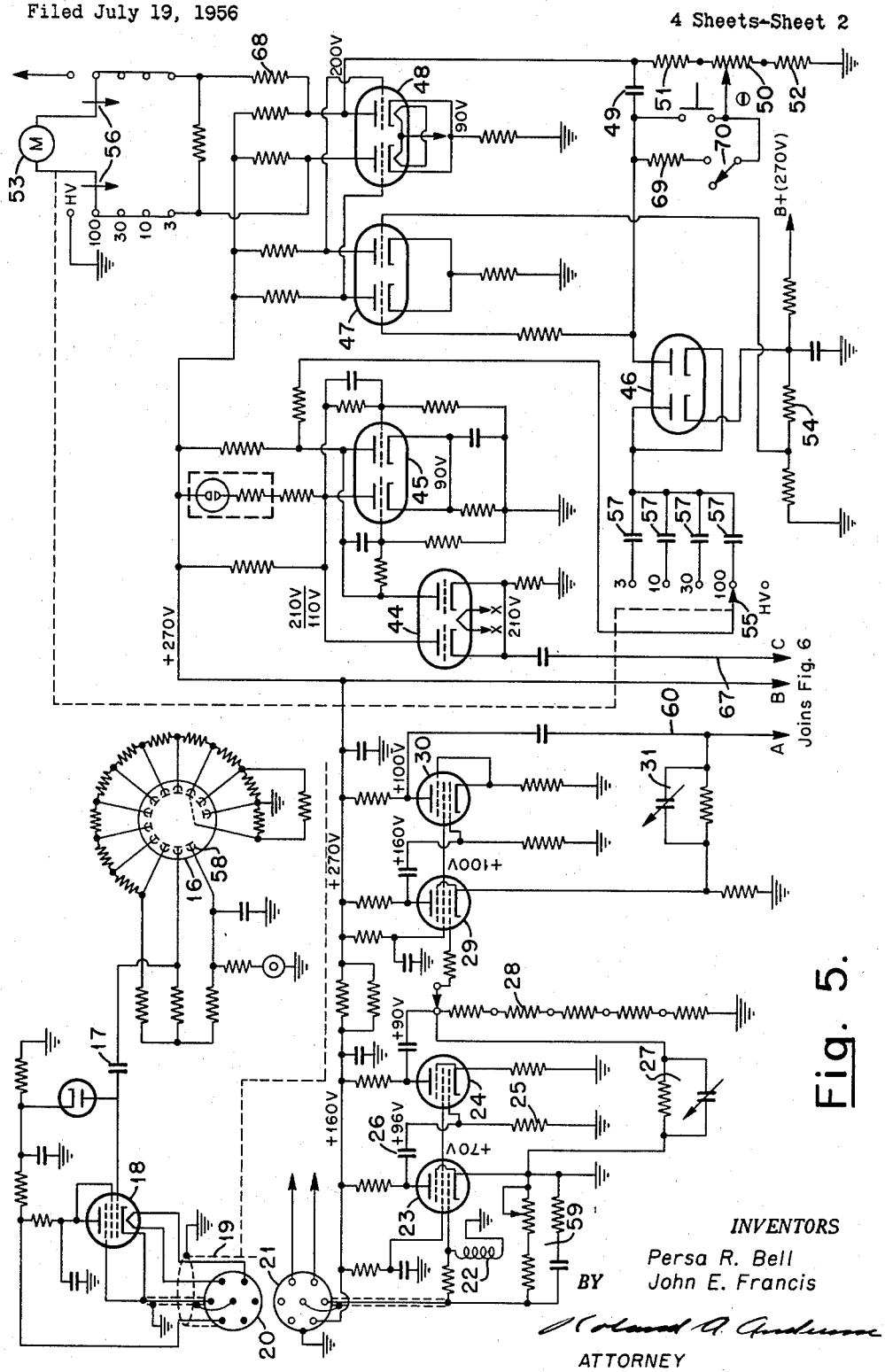

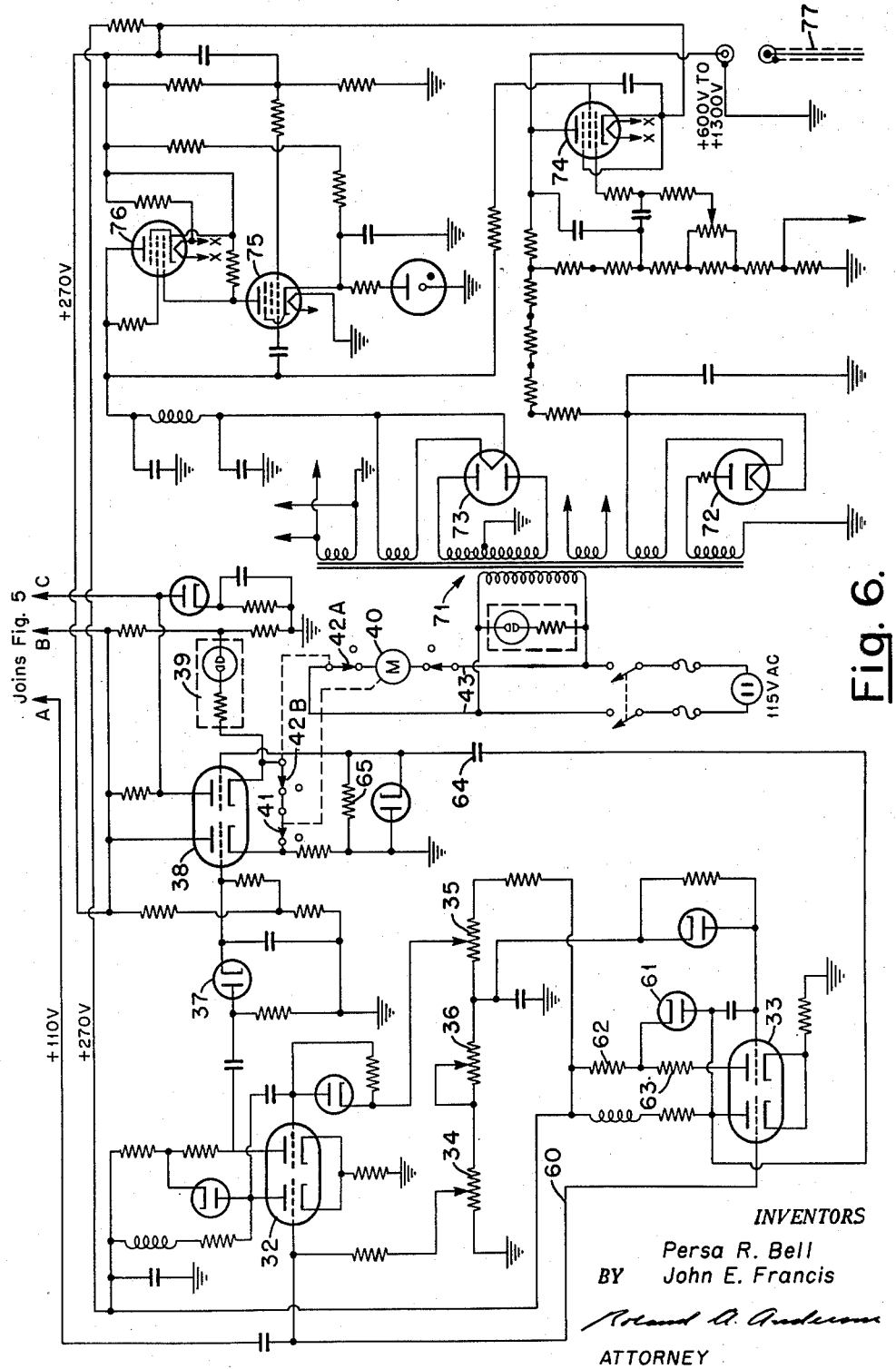

June 21, 1960  P. R. BELL ET AL  2,942,109
SCINTILLATION SPECTROMETER
Filed July 19, 1956  4 Sheets-Sheet 4

INVENTORS
Persa R. Bell
John E. Francis
BY
ATTORNEY

United States Patent Office 2,942,109
Patented June 21, 1960

2,942,109

SCINTILLATION SPECTROMETER

Persa R. Bell and John E. Francis, Oak Ridge, Tenn., assignors to the United States of America as represented by the United States Atomic Energy Commission Filed July 19, 1956, Ser. No. 598,969

4 Claims. (Cl. 250—71.5)

This invention relates to scintillation spectrometers and more particularly to a portable scintillation spectrometer which is especially useful in radio-biological studies where the uptake and distribution of gamma-emitting substances in tissue may be determined, and material assay and impurity identification, may be undertaken.

It has been the practice in certain diagnostic examinations and in biological treatments, particularly of humans, to inject into or feed the patient a substance containing an isotope which is a gamma-ray emitter. Usually the substance is so chosen that it has a special affinity for the organ to be examined or treated, for example, radioactive iodine which has an affinity for the thyroid. It is also desirable to limit the dosage of radioactive material in the human body to minimize radiation damage to healthy tissue.

The location and concentration of the substances must be ascertained in order to determine the uptake and distribution in tissue. In addition, the assay of the material to be used must be determined as well as the detection of radio impurities. Scintillation counting of these substances-radio iodine, for example, has been extremely difficult due to the inclusion of scattered radiations in the measurements. These scattered radiations can easily lead to an error of a factor of two or greater making precision dosimetry virtually impossible. While certain prior art scintillation spectrometers might overcome these disadvantages, they are too bulky and expensive for this type of usage.

Applicants with a knowledge of these problems of the prior art have for an object of their invention the provision of a scintillation spectrometer which overcomes the effects of scattered radiation by selecting and measuring the full energy peak.

Applicants have as another object of their invention the provision of a scintillation spectrometer which is sensitive to and measures radiation from a minimum dosage of radioactive materials, thus limiting the extent of radiation damage of healthy body tissue, and minimizing shielding requirements.

Applicants have as a further object of their invention the provision of a scintillation spectrometer which occupies a minimum of space, is of light weight, and may be quickly and easily applied to the various portions of the patient's body.

Applicants have as a further object of their invention the provision of a scintillation spectrometer for measuring gamma radiation, having a portable collimator that is focused to receive radiation from a small area and which may be employed to scan selective portions of the human body to localize areas of radioactive material concentrations or uptake.

Applicants have as a further object of their invention the provision of a focusing collimator which gives high radiation transmission of available activity and thus provides higher efficiency.

Applicants have as a further object of their invention the provision of a focusing collimator wherein transmission of radiation is increased by the order of many times over that of a single passage, the increase depending upon the number of openings in the collimator.

Applicants have as a still further object of their invention the provision of a focusing collimator which provides a better basis for diagnosis by giving more accurate information on distribution of activity.

Applicants have as a still further object of their invention the provision of a focusing collimator which can serve the dual purpose of scanning an area to measure total uptake on an approximate basis, and provide extremely sharp localization of activity.

Applicants have as a still further object of their invention the provision of a wide angle collimator for determining total uptake in an organ or over a large area to permit comparison of the uptake in different organs of sections of the body.

Applicants have as a still further object of their invention the provision of a scintillation spectrometer system which is both relatively compact and relatively sensitive as a result of the use of a preamplifier which acts as an impedance matching stage for driving an extension cable.

Other objects and advantages of our invention will appear from the following specification and accompanying drawings, and the novel features thereof will be particularly pointed out in the annexed claims.

Figure 1:
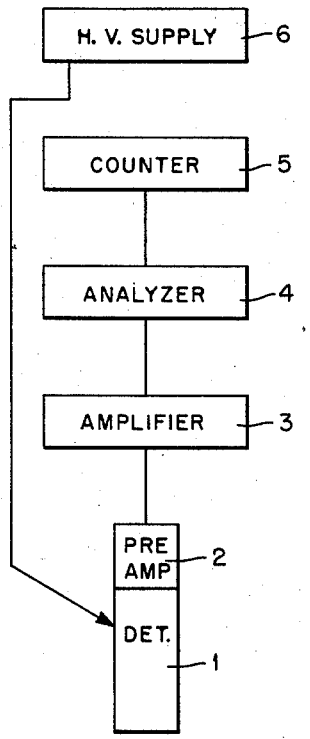
Figure 2:
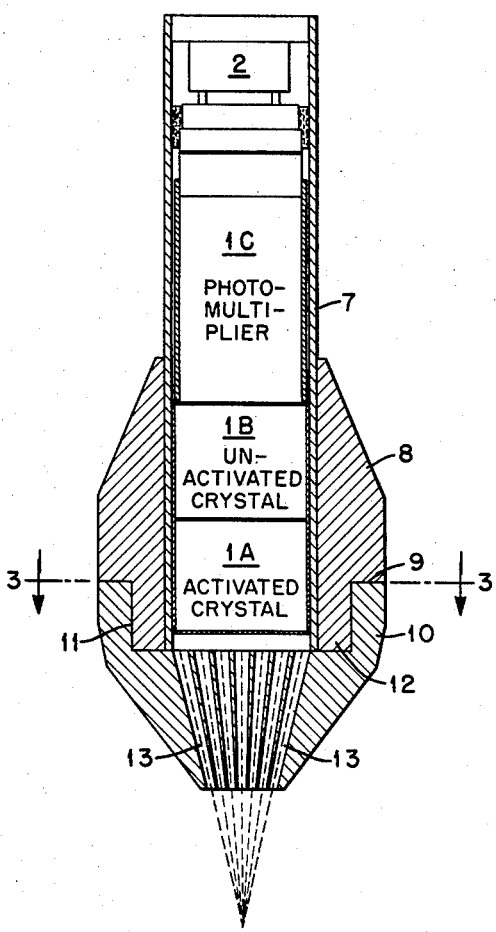
Figure 4:
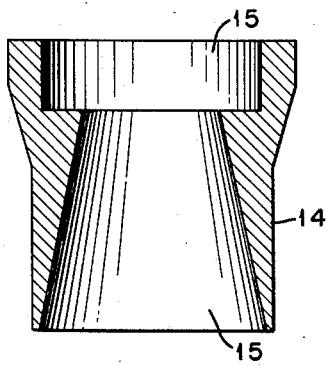
Figure 9:
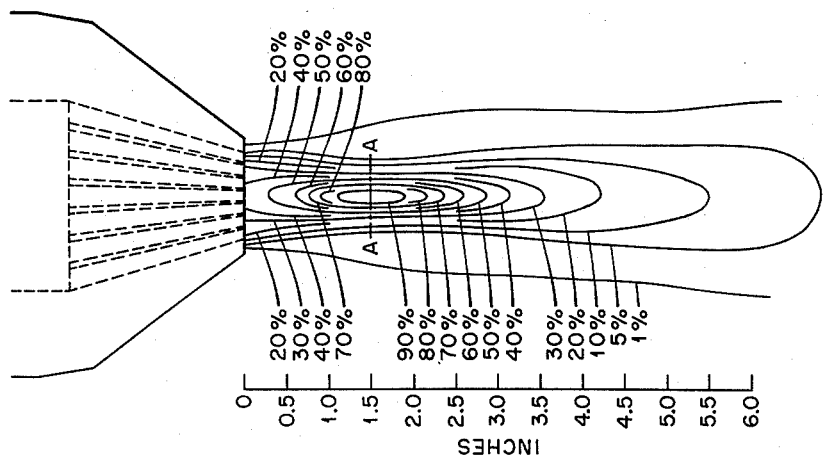
Figure 8:
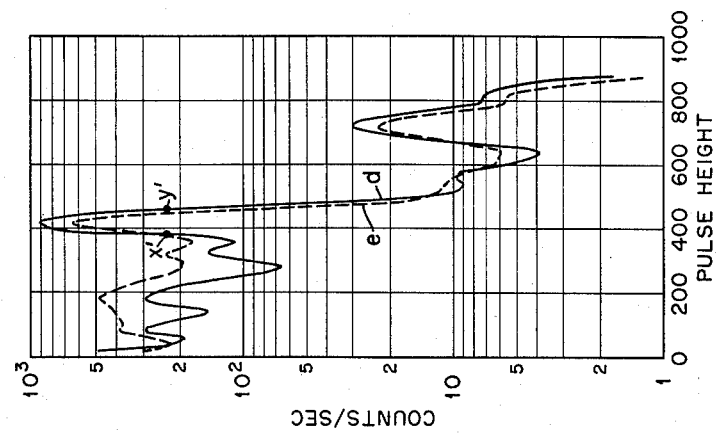
Figure 7:
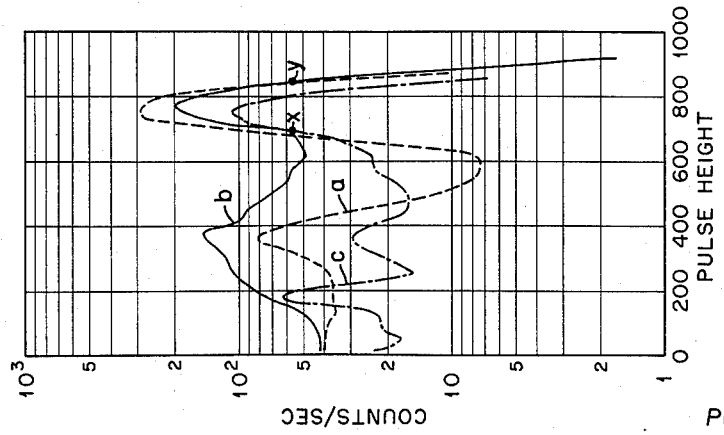

In the drawings, Fig. 1 is a block diagram of one form of our improved scintillation spectrometer. Fig. 2 is a sectional elevation of the detector housing with a collimator for spot focusing. Fig. 3 is a plan view of the collimator of Fig. 2 showing the configuration of the focusing slots or openings, in its lower face. Figure 4 is a sectional elevation of a wide angle collimator having a larger focusing area. Figure 5 is a schematic of the photo multiplier, preamplifier, and amplifier circuits. Figure 6 is a schematic of the analyzer, counter and power supply circuits. Figure 7 is a pulse height spectrum of chromium ($Cr^{51}$) with the source alone and with the source immersed in water. Figure 8 is a pulse height spectrum of iodine ($I^{131}$) with the source alone and with the source immersed in water. Figure 9 is a contour map showing the response of one form of focusing collimator.

Referring to the drawings in detail, and particularly to the block diagram of Figure 1, reference numeral 1 designates a detector which includes a collimator or focusing head for defining the origin or source position of the gamma ray. It will be understood that a collimator is normally employed to gather and collimate available radiation, while the present focusing head is used to restrict detection of rays to those from a desired source. Positioned beyond the collimator or focusing head is a scintillation crystal arrangement 1A, 1B and beyond this arrangement is a photomultiplier 1C which responds to fluorescent light or the photons from the crystal arrangement for producing electrical signals or impulses of appropriate magnitude. These signals are fed to a preamplifier 2 in the detector. The preamplifier is simply a cathode follower stage having a gain less than unity to provide a low impedance source to drive a cable carrying the signal to the linear amplifier 3. The linear amplifier gives a voltage signal proportional to the impressed charge from the photomultiplier. The voltage signal from the linear amplifier 3 is fed to the analyzer 4 which may take the form of a single channel analyzer of conventional form. Signals which fall within the limits of magnitude pass through the window of the analyzer 4 and are fed to a counter 5, such as a count integrate circuit or a count rate meter. Voltage to power the photomultiplier is supplied by high voltage source 6.

In its operation, gamma radiation from radioactive material in dosage given to a patient for examination or treatment and concentrated in selected tissue, or an organ of the body, for which it has particular affinity, passes through the collimator 10 and impinges upon the crystal 1A in the detector 1. The crystal has been activated and thus responds to gamma radiation and fluoresces. The photons reach the photomultiplier and produce signals which are amplified in preamplifier 2 and pass through linear amplifier 3 where they are amplified and fed to the discriminators of analyzer 4. Pulses passed by the analyzer are fed to counter 5 where they are counted and/or recorded.

Referring now to Figure 2 of the drawings, 7 designates an elongated tubular body portion telescoped at one end into a collar 8 of lead or other appropriate material. The lower extremity of the collar is reduced and terminates in a shoulder 9. This lower reduced end is adapted to seat in a socket and be received by a collimator or head 10 of lead or other suitable material. It is preferable to have the socket 11 of the head 9 machined to provide a close fit with the lower reduced end 12. However, if it is not feasible to provide a mounting for the head 10 on the collar 8 by a frictional fit through machining, then cooperating screw threads or interlocking lugs and grooves or any other conventional securing means may be employed.

Disposed within the lower end of the detector housing are a pair of stacked crystals. The lower crystal 1A is activated, and preferably consists of sodium iodine activated with thallium. The upper crystal 1B covers and shields the upper face of the lower crystal and is an inactivated crystal, preferably of sodium iodide. It serves to prevent external radiation from reaching the lower crystal from the back direction. The upper crystal interacts with the gamma rays approaching from the back side of the treated crystal and prevents them from reaching the treated crystal and causing it to fluoresce. The upper crystal, not being activated, will not fluoresce upon exposure to gamma radiation, but will pass the fluorescent light originating in the lower crystal so that it may reach the photomultiplier 1C. Positioned above the crystal assembly in the housing 7 is a photomultiplier which is adapted to respond to light from the lower crystal of the crystal assembly and produce electrical impulses. Disposed within the housing 7 above the photomultiplier is a preamplifier. This preamplifier 2 is coupled to and is adapted to receive the electrical impulses produced by the photomultiplier 1C, so that they may drive a cable which feeds into the linear amplifier, and thereby permit the detector housing 7 to be separated from the linear amplifier and to permit movement of the collimator over the selected portions of the patient's body, during the measurement operations.

The head shown mounted on the collar 8 of Fig. 2 will be seen to be of the type which may focus on a small area or spot of the subject to be examined. This head 10 comprises a series of tapered openings or passages 13 which diverge upwardly through the collimator. The axes of the passages converge downwardly and intersect at a selected distance from the face of the collimator, i.e. 2", or 3", etc. It will be noted in Fig. 3 that the cross section of the openings or passages 13 is hexagonal. This hexagonal cross section was discovered to provide uniform measurement and uniform focusing where the collimator was held in different positions and at different angles with respect to the area to be surveyed. It also provides maximum transmission for any minimum thickness of lead or other collimator material. The collimator 10, it will be noted, from Fig. 2, is adapted to focus on a spot of very small area as indicated by the broken lines of Fig. 2. This permits careful and concentrated examination of suspected areas of the subject.

Fig. 4 shows a modified form of collimator 14 having a socket 15 for receiving the lower reduced end 12 of the collar 8 of housing 7. It will be noted that collimator 10 may be removed from the collar 8 by slipping it over, separating it from the reduced end 12. The collimator 14 may then be substituted therefor. The collimator 14 of Fig. 4 is adapted to survey a somewhat wider area of the subject, and for this purpose is provided with a longitudinal bore 15 which converges upwardly. The lower end or mouth of the bore 15 indicates the extent of the area which the collimator 14 will survey. This type of collimator is used to survey larger organs or portions of the body or to cover substantial areas thereof.

Referring now to the circuit of Fig. 5, a conventional photomultiplier is shown at 16. The output or last dynode 58 of the photomultiplier 16 is coupled through capacitor 17 to the control grid of a cathode follower 18. This cathode follower drives a cable, generally designated 19, which is coupled through an adaptor, which includes plug 20 and socket 21, to a linear amplifier which may include a pair of feedback groups. The first feedback group fed by the cable and connected through its input to a differentiating network which may take the form of a short circuited delay line 22 includes tubes 23 and 24 coupled in cascade through conventional resistance capacitance coupling 25, 26. The feedback circuit is generally designated 27 and bridges the anode of tube 24 and the cathode of tube 23. The first feedback group 23, 24 is coupled through a step potentiometer 28 to the second feedback group which includes tubes 29 and 30. The second feedback group is generally similar to the first group with the feedback loop generally designated 31. The output of the output group 29, 30 is coupled through lead 60 into a single channel analyzer which contains two discriminators 32, 33, as shown in Figure 6. Discriminators 32, 33 may be biased to a desired potential to receive signals of a selected magnitude by means of the potentiometer 34. They may also be biased apart by a predetermined amount through the setting of a potentiometer 35. The potentiometer 36 is employed to fix the zero point. These potentiometers, it will be noted, are connected in series to provide a fixed resistance bank which may be bridged across a B+ source of potential and ground to provide a voltage drop which may be picked off at the various magnitudes by the movement of the adjustable potentiometer arms. The upper discriminator 32 has its output coupled through a diode 37, which acts as a pulse stretcher, to the input of the first section of a double triode 38 which serves as an anti-coincidence tube. The lower discriminator 33 has its output coupled to the second section of the double triode 38. It will be noted that the cathode circuit of the second section of double triode 38 is coupled through a count light 39 to provide an appropriate indication of the count. If desired, a conventional timer motor 40 may be employed to make and break the circuit between the cathodes of the two sections of the double triode 38 by means of the switch 41. The timer motor 40 of the remote control is connected through manually operated gang switch contacts 42A to a source of electrical power 43. The output of the second section of the anti-coincidence tube 38 is coupled into a scale of two scaler 45 through a double diode 44. The scaling circuit of the double triode 45 is conventional, and is preferably of the Higginbotham type. The scaler tube 45 has its output coupled to a series of capacitors 57 of different capacities to determine the scale factor. The appropriate capacity may be selected by a switch 55 whose contact arm is ganged to a switch 56 to be described more in detail hereinafter. These two switches are adapted to be manually operated in unison.

The coupling condensers 57 couple the scaler tube 45 through a double diode 46 to a pair of D.C. amplifiers generally designated by the double triodes 47 and 48. These D.C. amplifiers are coupled by a condenser 49 which bridges the plate of the second section of double triode 48 and the control grid of the first section of double triode 47 to provide a count integrate circuit. A voltage divider network 50, 51, 52 serves to couple one side of the condenser 49 to ground and effectively provides a means to zero the circuit and reset the same. The anodes of the double triode 48 are bridged by a meter 53 coupled thereto by the gang switches 56, 56. The network 54 serves as a voltage divider between B+ and ground for applying appropriate bias to the cathode of the first section of double diode 46 and the control grid of double triode amplifier 47. Addition of resistor 69 changes the circuit from a count integrate to a count rate circuit, and is accomplished by closing switch 70.

In its operation radiation from a dosage which has concentrated in a selected tissue of the body falls on the detector crystal 1A and causes the emission of light photons which pass through the shield crystal 1B of Fig. 2, and are collected on the photo cathode of the photomultiplier tube 1C. These photons cause the emission of electrons which are multiplied in the tube. By taking the signal from the last dynode 58 of the photomultiplier 16 a positive step pulse is obtained. This positive pulse is placed on the grid of the cathode follower 18 which drives the cable 19 carrying the signal to the input of the linear amplifier. The step pulse from the cathode of cathode follower 18 is first fed into a delay line 22 which is of the order of 1500 ohms, through its characteristic impedance to obtain a pulse 1 microsecond in duration. The differentiated signal from the differentiating circuit or shorted delay line 22 is placed on the input grid of the tube 23 of the first feedback loop which includes tubes 23 and 24 of the linear amplifier. A portion of the signal is fed through a network 59 to compensate for the D.C. resistance and complex frequency response of the delay line 22. The first feedback loop 23, 24 preferably has a gain of approximately 70. The step potentiometer 28 coupled to the output of the first feedback loop to ground provides gain control over a range of about 16 to 1.

The signal from the potentiometer 28 is then fed into the second feedback loop 29, 30 through the control grid of the first tube 29 and is intended to provide a gain of about 120. The output pulses vary from about 0 to 100 volts. The pulses from the second feedback loop are fed from the anode of tube 30 to the control grids of the first section of the discriminators 32 and 33 of Fig. 6. These discriminators are connected into a circuit to form a conventional single channel analyzer. The discrimination level of tubes 32 and 33 can be varied from a few volts to about 90 volts by means of the multi-turn potentiometer 34. The two discriminators are biased a fixed distance apart to provide a window. The extent of this window is determined by the setting of the potentiometer 35.

Normally when there is no signal into the discriminator 33, the cathodes of tube 33 are held at approximately 90 volts by the bias on the grid of the second section of the tube. No current is flowing in the first section of tube 33, and the grid of the first section of tube 33 is negative with respect to the cathode by a voltage determined by the setting of potentiometer 34. In order to get an output signal from the plate of the first section of tube 33, a signal from the linear amplifier through lead 60 must be large enough to raise the potential of the grid of the first section of tube 33 high enough to transfer the current from the second section to the first section of that tube. In order to sharpen this transfer point a crystal diode 61 is connected from the plate of the first section of tube 33 to the juncture of the load resistors 62 and 63. This effectively lowers the plate resistance of the first section of tube 33 to the forward resistance of the diode until this first section of the tube is drawing approximately sufficient current to place it in a region of higher gain. In one form this was found to be 1.3 milliamperes. When the tube draws more than that magnitude of current, a back voltage is developed on the crystal diode 61 and its resistance goes from a few hundred ohms to several thousands ohms. The increase of the impedance at this point causes a rapid transfer of current from the second section to the first section of double triode 33. The upper discriminator tube 32 operates in a similar fashion.

For a small signal lying below the value determined by the setting of potentiometer 34, neither discriminator is triggered, and there is no output pulse. When an input signal is large enough to trigger only the lower discriminator 33, the plate of the first section of that tube goes negative and charges the coupling condenser 64 which is coupled to the control grid of the second section of the anti-coincidence tube 38. When the input signal goes down below the trigger level, the plate of the first section of tube 33 returns to its original voltage, and a positive signal is produced at the control grid of the second section of the anti-coincidence tube 38 which decays away with the time constant determined by the total shunt capacity and the grid resistor 65. This transfers the current from the first half of tube 38 which is normally conducting, to the second half of that tube, giving a negative output from the plate of the second half of that tube. If, however, the input signal from the linear amplifier is large enough to trigger both discriminators 32 and 33, a positive signal is attained from the plate of the second section of the upper discriminator 32. In addition to the signal from the lower discriminator 33, the signal from the upper discriminator 32 is lengthened by the diode 37, which acts as a pulse stretcher, and is placed on the control grid of the first section of tube 38. This keeps the first section of tube 38 conducting even when the signal from the lower discriminator 33 appears at the grid of the second section of tube 38. By this means no output signal is obtained from the anti-coincidence tube 38.

It will be understood that the signal from the lower discriminator 33 does not appear on the grid of the second section of tube 38 until after the input pulse is no longer large enough to trigger the lower discriminator. This is necessary because of the finite rise and fall time of the pulses. On-off operation for counting is obtained by means of two switches in series connecting the cathodes of tube 38. These switches are designated 41 and 42B, the latter being ganged with switch 42A in the motor V circuit. The switch 41 operated by the timer 40 is normally closed as indicated in Fig. 6. Counting is started by closing the count switch 42A which also closes switch 42B. At the end for example of each 100 seconds the switch 41 operated by the timer 40 opens causing the counting operation to cease because the cathode of the second section of tube 38 is now disconnected and no signal can be obtained from the plate of the second section of that tube.

When switch 41 is opened by the operation of the timer motor 40, it will be understood that the motor continues to run until it is manually stopped by opening the gang switch contacts 42A, in the power circuit thereof. Then to restart the sequence, it is necessary to operate the reset. The sequence which results is to start the timer motor 40 by closing the switch contacts 42A, operate the motor timer until it opens the contacts 41, stop the time motor 40 by opening the gang switch contacts 42A, and then reset.

During the counting interval the output pulses from tube 38 are fed into the data storage section or counter shown in Fig. 5. This signal reaches the scale-of-two counter tube 45 through the diode 44 by lead 67. Each section of tube 45 has two stable states, and is triggered from one state to the other by successive, identical pulses which are fed through the diode 44. When the sections of the scaler stage 45 change from one stable stage voltage to the other, the coupling condensers 57 which are connected into the circuit by the switch 55 are charged or discharged through double diode 46. So for each two pulses into the scaling circuit a charge:

$$q = VC$$

is placed on the grid of the first section of double triode amplifier 47 where V is the difference in voltage of the two stable states of the two sections of tube 44, and C is the coupling capacity.

When a charge is placed on the grid of the first section of double triode 47 by the coupling condenser 49 and the diode 46, the plate of the second section of tube 48 has to go up about 45 volts and the plate of the first section of that tube down about 45 volts to obtain 1 milliampere of current in the cross resistor 68 and meter 53 bridged across the plates of the first and second sections of tube 48. By using a 100 second predetermined time, the current in the meter 53 is calibrated in counts per second. The value for the coupling condenser 57 is obtained from the relation:

$$q = \frac{N}{2} E_1 \times C = E_2 \times C_f$$

where $C_f$ is the capacitor 49, $E_2$ is a change in voltage across $C_f$, $E_1$ is the voltage change of the scaler plate, and N is the number of counts.

The meter 53 can also be used to read count rate by closing switch 70 and thus connecting the resistor 69 in the circuit to the potentiometer 50, which allows the charge to leak off of the condenser 49 continuously.

Power is supplied to the system and to the photomultiplier through the power transformer 71, rectifiers 72, 73 and control tubes 74, 75 and 76. The positive high voltage supply for the photomultiplier is ordinarily regulated by tube 74 using the positive B+ voltage supply as the reference voltage. It is supplied through cable 77.

The spectra of $I^{131}$, $Cr^{51}$ and $Cs^{137}$ are typical of the radioisotopes which may be utilized and measurements taken with this spectrometer. Chromium and cesium are especially well suited for these tests or calibration measurements, since they each have a single gamma-ray which closely approximates one of the two main gamma rays encountered in iodine, which is one of the most widely used isotopes at this time.

Figure 7 shows the spectra obtained under three different conditions from $Cr^{51}$ which has a single gamma ray of 320 kev. Curve "a" indicated in the form of dashes in Fig. 7, represents the spectrum obtained with the source at 3" from the crystal. The main peak at 780 pulse height units is the photoelectric peak, while the counts in the region 0 to 400 pulse height units are produced largely by Compton scattering in the crystal, although a few of them are due to detection of scattered radiation from the source and the crystal container. The source was then immersed in a 800 ml. beaker of water to give an approximation of the conditions encountered in actual thyroid treatments. Putting water around the source gives a good approximation of the effect of putting a patient around the source. The spectrum shown by the curve labeled "b" in solid lines, was obtained under the above conditions. The main peak at 780 pulse height units is attenuated by absorption of the gamma rays in the water. It should be noted that the number of counts in the entire range 0 to 600 pulse height units is increased due to the scattered radiations. The third curve, which is a dot and dash curve labeled "c" shows the spectrum obtained with a 1/16" lead shield placed between the source and water and the crystal. The entire spectrum is attenuated with the exception of the valley below the peak at 780 pulse height units and a peak at 180 pulse height units due to lead X-rays appears.

Figure 8 shows a spectra of $I^{131}$ under two different conditions. The solid curve labeled "d" shows a spectrum for the bare source and the dotted curve labeled "e" was obtained when the source was immersed in water. The detail of the spectrum for the bare source is sufficiently good to permit detection of radioactive contaminants if any were present.

The only portions which it is desired to measure are those which correspond to primary radiation from the source. Therefore, the discriminators of the circuit, heretofore described, are set at a value to detect radiation within the energy limits indicated by the points $x$, $y$ of Figure 7, or $x'$, $y'$ of Figure 8. By discriminating at these points it is possible to eliminate radiation from scattering which would effect the results, since the only part of the radiation which is passed by the system is that which lies between points $x$ and $y$ of Figure 7, and $x'$ and $y'$ of Figure 8.

Figure 12 shows a contour map of the response of the focusing collimator to a 320 kev. gamma ray point source, counting only the primary ondegraded radiation. It will be noted that a source on the axis gives a lower counting rate when in contact with the front face of the collimator than it does at 1.5" away, which is the point of maximum sensitivity. Using the spot focusing collimator it is possible to detect the 1 cm. void at depth of .75" and a solution tank 5" in diameter and 1.5" deep. The solution contained .07 microcurie per milliliter of iodine equivalent.

Having thus described our invention, we claim:

1. A system for measuring radiation comprising a collecting head for passing radiations from a selected source, a crystal arrangement including an activated crystal having one face for receiving gamma radiations passed by the head to produce fluorescence, and a second unactivated crystal for covering the other face of the first named crystal to isolate it from external radiation, means for converting the fluorescence of said crystal arrangement into signals corresponding to the energy of the gamma radiations, an analyzer for selectively passing the signals from the converting means, and a counter for counting the signals passed by the analyzer.

2. A system for measuring radiation comprising a collimator for passing radiations from a gamma source in a sharply defined limited region of tissue, a crystal arrangement including an activated crystal having one face for receiving gamma radiations passed by the collimator to produce fluorescence, and a second unactivated crystal for covering the other face of the first named crystal to isolate it from the effects of external radiation, means for converting the fluorescence from said crystal arrangement into signals corresponding to the energy of the gamma radiation, an analyzer for selectively passing the signals from the converting means, and a counter for counting the signals passed by the analyzer.

3. A system for measuring radiation comprising a focusing collimator for focusing on a gamma source in tissue and for passing radiations from a sharply defined limited region thereof, a crystal arrangement including an activated crystal having one face for receiving gamma radiations passed by the collimator to produce fluorescence and a second unactivated crystal for covering the other face of the first named crystal to isolate it from the effects of external radiation, a photomultiplier responsive to the fluorescence from the crystal arrangement for producing signals corresponding to the energy of the gamma radiations, an analyzer for selectively passing signals of a predetermined magnitude from the converting means, and a counter for counting the signals passed by the analyzer.

4. A system for measuring radiation comprising a focusing collimator head for passing radiation from a spot gamma source located in a sharply defined limited region in tissue, an activated crystal sensitive to gamma radiation for receiving radiations from the head to produce fluorescence, a photomultiplier responsive to the fluorescence from said crystal for producing signals corresponding to the energy of the gamma radiation, a window analyzer for selectively passing signals within a selected limited range of magnitudes from the photomultiplier, means for remotely coupling the analyzer to the photomultiplier, said means including a cathode follower for providing a low impedance driving circuit, and a counter for counting the signals passed by the analyzer.

References Cited in the file of this patent

UNITED STATES PATENTS

| | | |
|---|---|---|
| 2,585,551 | Hofstadter | Feb. 12, 1952 |
| 2,659,017 | Bartow | Nov. 10, 1953 |
| 2,739,242 | Armistead | Mar. 20, 1956 |
| 2,741,710 | Bartow et al. | Apr. 10, 1956 |
| 2,749,446 | Herzog | June 5, 1956 |
| 2,755,390 | Teichmann | July 17, 1956 |
| 2,758,217 | Scherbatskoy | Aug. 7, 1956 |
| 2,768,307 | Tirico | Oct. 23, 1956 |
| 2,769,918 | Tittle | Nov. 6, 1956 |
| 2,806,147 | Stellmacher | Sept. 10, 1957 |

OTHER REFERENCES

Analyzing for Low-Energy Gamma Emitters in a Rationuclide Mixture, by Upton et al., in Nucleonics, April 1955, pp. 38–42.